(12) United States Patent
Van Datta

(10) Patent No.: US 8,260,860 B2
(45) Date of Patent: *Sep. 4, 2012

(54) DYNAMIC BANDWIDTH CONTROL

(75) Inventor: Glen Van Datta, San Diego, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,081

(22) Filed: Jul. 28, 2011

(65) Prior Publication Data

US 2011/0289152 A1 Nov. 24, 2011

Related U.S. Application Data

(63) Continuation of application No. 12/838,207, filed on Jul. 16, 2010, now Pat. No. 8,010,606, which is a continuation of application No. 12/143,627, filed on Jun. 20, 2008, now Pat. No. 7,779,075, which is a continuation of application No. 10/341,278, filed on Jan. 9, 2003, now Pat. No. 7,426,539.

(51) Int. Cl.
*G06F 15/16* (2006.01)

(52) U.S. Cl. ........ 709/205; 709/223; 709/246; 709/248; 715/757; 715/758

(58) Field of Classification Search .................. 709/204, 709/205, 246, 248; 715/750, 753, 757, 758
See application file for complete search history.

(56) References Cited

U.S. PATENT DOCUMENTS

| | | | |
|---|---|---|---|
| 5,008,853 A | 4/1991 | Bly et al. | |
| 5,736,982 A * | 4/1998 | Suzuki et al. | 715/706 |
| 5,838,909 A | 11/1998 | Roy et al. | |
| 5,841,980 A | 11/1998 | Waters et al. | |
| 5,893,106 A | 4/1999 | Brobst et al. | |
| 5,913,032 A | 6/1999 | Schwartz et al. | |
| 5,956,038 A * | 9/1999 | Rekimoto | 345/419 |

(Continued)

FOREIGN PATENT DOCUMENTS

EP    0992922 A2    4/2000

(Continued)

OTHER PUBLICATIONS

European Patent Office, "Communication pursuant to Article 94(3) EPC" issued in European Patent Application No. 10011054.3 dated Jan. 31, 2012, 4 pages.

(Continued)

*Primary Examiner* — Oanh Duong

(74) *Attorney, Agent, or Firm* — Fitch, Even, Tabin & Flannery, LLP

(57) ABSTRACT

Data transfer over a computer network relating to a data object of a multiple user network application, from a network user who owns the data object to an updating user, is achieved by transfer of a subset of data fields that define the data object, such that the subset of data fields is specified by the updating user and is less than a full update transfer comprising updated values for all the data fields that define the data object. Each data object is defined by multiple data fields, such that the transfer of a subset of the data object data fields ensures that the network bandwidth utilized for data updates will be reduced from the situation in which all the defining data fields for an object being updated are transferred over the network.

10 Claims, 6 Drawing Sheets

U.S. PATENT DOCUMENTS

| | | | |
|---|---|---|---|
| 5,956,489 | A | 9/1999 | San Andres et al. |
| 5,966,512 | A | 10/1999 | Bates et al. |
| 5,983,263 | A | 11/1999 | Rothrock et al. |
| 6,041,312 | A | 3/2000 | Bickerton et al. |
| 6,049,809 | A | 4/2000 | Raman |
| 6,088,035 | A | 7/2000 | Sudarsky et al. |
| 6,105,055 | A * | 8/2000 | Pizano et al. ............... 709/204 |
| 6,167,433 | A | 12/2000 | Maples et al. |
| 6,219,045 | B1 | 4/2001 | Leahy et al. |
| 6,230,171 | B1 * | 5/2001 | Pacifici et al. ............... 715/201 |
| 6,338,086 | B1 | 1/2002 | Curtis et al. |
| 6,412,017 | B1 | 6/2002 | Straube et al. |
| 6,437,778 | B1 | 8/2002 | Matsui et al. |
| 6,557,041 | B2 | 4/2003 | Mallart |
| 6,672,961 | B1 | 1/2004 | Uzun |
| 6,826,523 | B1 | 11/2004 | Guy et al. |
| 6,938,070 | B2 * | 8/2005 | Esposito ..................... 709/205 |
| 7,007,236 | B2 | 2/2006 | Dempski et al. |
| 7,039,723 | B2 * | 5/2006 | Hu et al. ..................... 709/248 |
| 7,181,690 | B1 * | 2/2007 | Leahy et al. ................. 715/706 |
| 7,426,539 | B2 | 9/2008 | Van Datta |
| 7,779,075 | B2 * | 8/2010 | Van Datta ................... 709/205 |
| 8,010,606 | B2 | 8/2011 | Van Datta |
| 2002/0026478 | A1 | 2/2002 | Rodgers et al. |
| 2002/0049812 | A1 * | 4/2002 | Nahon ........................ 709/204 |
| 2002/0129175 | A1 * | 9/2002 | Banavar et al. ............. 709/310 |
| 2002/0143859 | A1 * | 10/2002 | Kuki et al. .................. 709/203 |
| 2003/0018719 | A1 | 1/2003 | Ruths et al. |
| 2003/0055896 | A1 * | 3/2003 | Hu et al. ..................... 709/205 |
| 2003/0115268 | A1 * | 6/2003 | Esposito ..................... 709/205 |
| 2003/0204566 | A1 | 10/2003 | Dhupelia et al. |
| 2003/0217081 | A1 * | 11/2003 | White et al. ................. 707/203 |
| 2004/0044732 | A1 * | 3/2004 | Fushiki et al. .............. 709/205 |
| 2004/0111398 | A1 | 6/2004 | England et al. |
| 2004/0127242 | A1 * | 7/2004 | Dashevsky et al. .......... 455/502 |
| 2004/0155902 | A1 * | 8/2004 | Dempski et al. ............. 345/757 |
| 2010/0281116 | A1 | 11/2010 | Van Datta |

FOREIGN PATENT DOCUMENTS

| | | |
|---|---|---|
| JP | 11-177628 | 7/1999 |
| JP | 2001-197147 | 7/2001 |
| JP | 2001-232068 | 8/2001 |
| JP | 2002-189622 | 7/2002 |
| WO | 02/15041 | 2/2002 |
| WO | 02/086835 | 10/2002 |

OTHER PUBLICATIONS

European Patent Office; "Communication pursuant to Article 94(3) EPC" issued in corresponding European Application No. 03815179.1; dated Nov. 8, 2011; 3 pages.

Patent Office of the People's Republic of China; "The First Office Action" for Chinese Patent Application 03805935.5; dated Dec. 1, 2006; 21 pages including English language translation.

Japanese Patent Office; "Notification of Reason(s) for Refusal" for Japanese App. No. 2004-566428; dated Mar. 6, 2007; 4 pages including English language translation.

Patent Cooperation Treaty; "Notification of Transmission of International Search Report" for International App. No. PCT/US03/24308; dated Apr. 22, 2004; 1 page.

Patent Cooperation Treaty; "International Search Report" for International App. No. PCT/US03/24308; dated Apr. 22, 2004; 6 pages.

Patent Cooperation Treaty; "Notification of Transmittal of International Preliminary Examination Report" for International App. No. PCT/US03/24308; dated Jun. 7, 2004; 1 page.

Patent Cooperation Treaty; "International Preliminary Examination Report" for International App. No. PCT/US03/24308; dated May 31, 2004; 3 pages.

Taiwan Intellectual Property Office; "Preliminary Examination Report" for Taiwan Patent App. No. 92121970; dated May 17, 2005; 8 pages including English language summary.

European Patent Office; "Communication pursuant to Article 94(3) EPC" issued in European Patent Application No. 03 815 179.1; dated Apr. 8, 2008; 4 pages.

Japanese Patent Office; "Decision of Refusal" for Japanese App. No. 2004-566428; dated Jul. 3, 2007; 3 pages including English language translation.

European Patent Office; "Communication" for European Patent Application No. 03 815 179.1; dated Aug. 2, 2007; 1 page.

European Patent Office; "Supplementary European Search Report" for European Patent Application No. 03 815 179.1; dated Jul. 25, 2007; 2 pages.

European Patent Office; "Communication pursuant to Article 96(2) EPC" issued in European Patent Application No. 03 815 179.1; dated Nov. 5, 2007; 4 pages.

Korean Intellectual Property Office; "Grant of Patent" for Korean Patent Application No. 10-2004-7013086; dated Apr. 20, 2006; 3 pages.

Republic of China Patent Office; "Republic of China Patent Certificate" issued for Taiwan Patent No. I263154; dated Oct. 1, 2006; 2 pages.

Korean Intellectual Property Office; "Certificate of Patent" for Korean Patent Application No. 10-2004-7013086; dated Jul. 3, 2006; 2 pages.

Korean Intellectual Property Office; "Original Register of Patent" for Korean Patent Application No. 10-2004-7013086; dated Jul. 3, 2006; 2 pages.

Japanese Patent Office; "Questioning" for Japanese App. No. 2004-566428; dated Jan. 19, 2010; 4 pages and 5-page English language translation.

Yuka, Kirishima, "Building and Enjoying Your Own! ABCs of Network Games," C Magazine, vol. 14, No. 6, Japan, Softbank Publishing, Jun. 1, 2002, p. 39-49.

Shinji, Shiota, "Benefits Guaranteed. Basic Knowledge of DOS/V Machines, Part 19," ASCII DOS/V Issue, vol. 4, No. 12, Japan, Ascii Corporation, Dec. 1, 1998, p. 338-339.

Yasushi, Taki, "To the Horizon of Network Games," Oh! X 1999 Sprint, Japan, Softbank Publishing, May 14, 1999, p. 186-191.

USPTO; "Supplemental Notice of Allowability" issued in U.S. Appl. No. 10/341,278; mailed Aug. 14, 2008; 3 pages.

USPTO; "Notice of Allowance and Fee(s) Due" issued in U.S. Appl. No. 10/341,278; mailed Apr. 7, 2008; 8 pages.

USPTO; "Interview Summary" issued in U.S. Appl. No. 10/341,278; mailed Apr. 7, 2008; 1 page.

USPTO; "Office Action" issued in U.S. Appl. No. 10/341,278; mailed Nov. 15, 2007; 16 pages.

USPTO; "Final Office Action" issued in U.S. Appl. No. 10/341,278; mailed Jul. 13, 2007; 15 pages.

USPTO; "Office Action" issued in U.S. Appl. No. 10/341,278; mailed Jan. 29, 2007; 14 pages.

USPTO; "Final Office Action" issued in U.S. Appl. No. 10/341,278; mailed Nov. 25, 2005; 15 pages.

USPTO; "Interview Summary" issued in U.S. Appl. No. 10/341,278; mailed Sep. 19, 2005; 3 pages.

USPTO; "Office Action" issued in U.S. Appl. No. 10/341,278; mailed Jun. 3, 2005; 12 pages.

USPTO; "Final Office Action" issued in U.S. Appl. No. 10/341,278; mailed Oct. 21, 2004; 13 pages.

USPTO; "Office Action" issued in U.S. Appl. No. 10/341,278; mailed Apr. 7, 2004; 12 pages.

Patent Office of the People's Republic of China; "Second Office Action" issued in corresponding Chinese Application No. 03805935.5; dated Jul. 31, 2009; 4 pages and 6-page English language translation.

USPTO; "Office Action" issued in U.S. Appl. No. 12/143,627; mailed May 29, 2009; 16 pages.

USPTO; "Final Office Action" issued in U.S. Appl. No. 12/143,627; mailed Jan. 19, 2010; 21 pages.

USPTO; "Notice of Allowance" issued in U.S. Appl. No. 12/143,627; mailed Apr. 7, 2010; 9 pages.

European Patent Office; "Communication Pursuant to Article 94(3) EPC" issued in corresponding European Application No. 03815179.1; dated May 9, 2011; 4 pages.

European Patent Office; "Extended European Search Report" issued in corresponding European Application No. 10011054.3; dated May 11, 2011; 6 pages.

Ma Wei-Ying et al.; "A Framework for Adaptive Content Delivery in Heterogeneous Network Environments;" Hewlett-Packard Laboratories; Jan. 24, 2000; 14 pages.

USPTO; "Office Action" issued in U.S. Appl. No. 12/838,207; mailed Dec. 9, 2010; 5 pages.

USPTO; "Notice of Allowance" issued in U.S. Appl. No. 12/838,207; mailed Mar. 31, 2011; 5 pages.

* cited by examiner

DYNAMIC BANDWIDTH CONTROL

CROSS-REFERENCE TO RELATED APPLICATIONS

This application is a continuation of U.S. patent application Ser. No. 12/838,207, filed Jul. 16, 2010, entitled "DYNAMIC BANDWIDTH CONTROL", which is a continuation of U.S. patent application Ser. No. 12/143,627, filed Jun. 20, 2008, entitled "DYNAMIC BANDWIDTH CONTROL", now U.S. Pat. No. 7,779,075, which is a continuation of U.S. patent application Ser. No. 10/341,278, filed Jan. 9, 2003, entitled "DYNAMIC BANDWIDTH CONTROL", now U.S. Pat. No. 7,426,539, the entire disclosures and contents of which are all hereby fully incorporated by reference herein in their entireties.

BACKGROUND OF THE INVENTION

1. Field of the Invention

The present invention relates generally to computer networks and, more particularly, to applications that are executed by multiple users over a computer network.

2. Discussion of the Related Art

Computer networks, such as local area networks and the Internet, are increasingly being used as the backbone for various transactions and interactions between parties. From online banking, where bank customers can initiate financial transactions over a computer network, to online gaming, where gamers can participate in real-time gaming over the Internet, service providers are increasingly supporting a variety of services over computer networks. There are currently a variety of different computer network configurations that facilitate the transactions and interactions that take place.

Many of the online applications involve multiple-user applications, which are computer programs that are executed on a computer system and which allow multiple geographically separated participants to interact with the computer program and other participating users in an application environment. For example, on-line gaming is a popular multiple user application that is increasing in popularity. An on-line aircraft simulation game can enable multiple participants to pilot their respective virtual aircraft within a virtual airspace, and can enable the participants to interact with other participants in their aircraft in the same airspace. Each participant has control over the flying actions of their respective virtual aircraft. That is, each participant has ownership of an application object comprising an aircraft. Thus, the online aircraft gaming application provides a single application environment or universe in which multiple participants maneuver their respective objects.

In a multiple user application environment, such as online gaming, with distinct, geographically dispersed application users, such as game participants, each participant will generally be responsible for one or more data objects that will be modified or manipulated by the local user of the application. These data objects are "ownable" data objects and each user is associated with one or more such corresponding application objects.

For example, in an on-line gaming environment, each participant will generally be responsible for maintaining state data about that participant's contestant or entry in the gaming application environment. The participant's game entry is typically represented by a data object. In a transactional multiple user environment, a user might be responsible for data relating to an account, which is represented by a data object. In both application environments, the respective user is said to "own" the data object, either the game participant object or the transaction account object, in that the user has responsibility for updating the user's data object in the application environment. In the game scenario, the user typically has control over movement of the corresponding data object within the shared object space of the game application, and typically also has responsibility for maintaining data about the data object state (and so owns the data object).

To support real-time interaction among the users in a multiple user application environment, it has been necessary to share information about every participant's corresponding data object in the application environment. The state of a user's data object can be defined by a collection of data fields whose values can change during the user interaction. For example, in a game application, the data object of a user will change position in the game environment, and in a transactional application, the data object of a user will have a changed transaction history and account balance.

To share state information for the user's data object among the network users, it is necessary to share the value of the various data fields that define the data object. For example, in an aircraft simulation multiple user application, where each user is represented by an aircraft data object, the data fields relating to state information about the aircraft can include aircraft size, aircraft speed, altitude in three-dimensional space, appearance details (such as battle damage or control surface position), virtual environment details (such as buildings, weather, and terrain), and the like. Such state information permits the computer at each participant to properly keep track of game developments and determine the actions being performed by each of the other participants. This permits each participant to produce properly rendered visual images on the participant's viewing display, and permits the other participants to do likewise. In a transactional application environment, the data fields might include user name, account information, account balance, and the like. Such information would permit multiple users to ascertain details about a particular transactional account.

Some on-line, multiple user applications communicate details about the state of respective user application objects by sending network update messages to all users, in accordance with an application update time interval. For an online game, a user who is a game participant will be responsible for maintaining an up-to-date set of data fields for the application object owned by that network user. If a change has occurred in the state of the application object owned by the network user, such as an aircraft in a simulation game, then the owning user must communicate those changes to the other network participants via update messages. Thus, each network user who owns a data object will prepare and send update messages to the other network clients to keep them apprised of changes in their data object. In this way, update messages from each owning user will communicate changes in the data fields to the other network clients. Thus, all the network user participants will be kept informed with accurate data object status information.

Unfortunately, the amount of data to be communicated via the update messages and shared among all the participants can be onerous. As noted above, the data fields needed to update the visual rendering of a game participant's application object in an aircraft simulation application can include information such as aircraft size, speed, and altitude, appearance details (such as external damage or control surface position), virtual environment details (such as buildings, weather, and terrain), and the like. The amount of information that must be shared among all of the application participants can be so great that it can result in bandwidth saturation. That is, some users might have limited network bandwidth and might have difficulty receiving update messages quickly enough in real time to remain "in play" through the application environment created by the network application.

One way to permit users with limited bandwidth to participate in multiple user applications, such as on-line gaming, is to reduce the number of data objects whose details are being shared among all users. This can be achieved, for example, by dividing the application environment into zones of interest so that users in one application environment area of interest are not provided with information about application objects in other application environment areas. A user who owns a data object in one area of the application environment need not send updated data fields to users in other areas of the application environment. This reduces the amount of information that must be transmitted each owning user over the network. Each user does not necessarily need to download each and every update message propagated by the network clients for the application. Such a system is described, for example, in the distributed processing system of U.S. Pat. No. 5,841,980 by R. Waters and J. Allred. With such distributed processing in place, a user can be spared downloading and processing all the update messages for an application object. This means that real-time interaction of the participants will not be slowed by processing of update messages.

Even with a limited-sharing environment, however, the number of data fields associated with a data object can be sufficiently numerous or detailed that a user's bandwidth could still be taxed by demands for processing relating to all the application objects that are within the user's virtual environment zone of interest. In fact, the update messages for application objects in the same application environment zone could include much data that is of no importance from the network client's perspective. This can be the case, for example, if the application object update message includes all the graphical information needed for a detailed rendering, though the application object is not sufficiently close to the user's viewing perspective to see the details. In addition, even if a user has a reserve of bandwidth available, it is more efficient for network operations if network data traffic did not include all data fields for all data objects, regardless of need at each participating user.

Thus, current multiple user applications are not configured for maximum efficiency with respect to application object updates. Even data transfers based on dividing an application environment into distinct update zones can still tax the bandwidth resources of participants and create unnecessary network data traffic. Thus, there is a need for an improved, more efficient online multiple user application environment. The present invention satisfies this need.

SUMMARY OF THE INVENTION

Data transfer over a computer network relating to a data object of a multiple user network application, from a network user who owns the data object to an updating user, is achieved by transfer of a subset of data fields that define the data object, such that the subset of data fields is specified by the updating user and is less than or equal to a full update transfer comprising updated values for all the data fields that define the data object. Because each data object is defined by multiple data fields, the transfer of a subset of the data object data fields ensures that the network bandwidth utilized for data updates will be reduced from the situation in which all the defining data fields for an object being updated are transferred over the network.

In accordance with one embodiment of the invention, a data update request message is sent from the updating user to the owning user such that the request message specifies a subset of update data that is desired by the updating user. The updating user determines the data fields subset that will be needed for processing of the network application at the updating user. When the specified subset of update data is received by the updating user, the corresponding data fields for the application object as maintained by the updating user are updated with the received subset data. In this way, it is not necessary for the updating user to always request and receive the update data for all the data fields that define the data object. Rather, the updating user can request a reduced subset of update data for the application object. This can reduce the bandwidth required by the updating user to execute the multiple user network application and to update the state of the application object.

Another embodiment provides a method of computer network data transfer, the method comprising: updating, by an owning user, a set of data fields that define a data object in a multiple user network application shared data space; receiving, by the owning user from an updating user, a network data update request message requesting an update data subset from the owning user, the update data subset being determined by the updating user and relating to the data object maintained by the owning user, wherein the updating user maintains a local copy corresponding to the data object and the update data subset specifies a set of data fields that is less than a full data update for the data object; and transmitting, by the owning user to the updating user, update data for the data object comprising the set of data fields as determined by the updating user.

Another embodiment provides a program product for use in a computer device that executes program instructions recorded in a computer-readable storage media to perform a method for data transfer over a computer network, the program product comprising: a recordable media; and a plurality of computer readable instructions executable by the computer device to perform a method comprising: updating, by an owning user, a set of data fields that define a data object in a multiple user network application shared data space; receiving, by the owning user from an updating user, a network data update request message requesting an update data subset from the owning user, the update data subset being determined by the updating user and relating to the data object maintained by the owning user, wherein the updating user maintains a local copy corresponding to the data object and the update data subset specifies a set of data fields that is less than a full data update for the data object; and transmitting, by the owning user to the updating user, update data for the data object comprising the set of data fields as determined by the updating user.

Another embodiment provides a device comprising: a network communication interface that supports data transfer between the device and a network; and a central processing unit that executes program instructions to provide a multiple user network application in which, the device updates a set of data fields that define a data object in a multiple user network application shared data space; the device receives, from an updating user, a network data update request message requesting an update data subset from the owning user, the update data subset being determined by the updating user and relating to the data object maintained by the device, wherein the updating user maintains a local copy corresponding to the data object and the update data subset specifies a set of data fields that is less than a full data update for the data object; and the device transmits, to the updating user, update data for the data object comprising the set of data fields as determined by the updating user.

Another embodiment provides a method of computer network data transfer, the method comprising determining, by an updating user, an update data subset relating to a data object maintained by an owning network user in a multiple user network application shared data space, wherein the updating user maintains a local copy corresponding to the data object and the update data subset specifies a set of data fields that is less than a full data update for the data object, sending, by the updating user, a network data update request message to the owning network user, the network data update request message requesting the determined update data subset from the owning network user and receiving, by the updating user, update data from the owning network user for the data object comprising the set of data fields as determined by the updating user.

Another embodiment provides a device comprising a network communication interface that supports data transfer between the device and a network and a central processing unit that executes program instructions to provide a multiple user network application in which the device determines an update data subset relating to a data object maintained by an owning network user in a multiple user network application shared data space, wherein the device maintains a local copy corresponding to the data object and the update data subset specifies a set of data fields that is less than a full data update for the data object, the device sends a network data update request message to the owning network user that requests the determined update data subset from the owning network user and the device receives update data from the owning network user for the data object comprising the set of data fields as specified by the determined update data subset.

Another embodiment provides a method of data transfer over a computer network from a data object owning user to an updating user, the method comprising determining update data at the owning user for a set of data fields that define a data object in a multiple user network application, determining, by the updating user, an update data message that specifies an update data subset relating to the data object for the multiple user network application, wherein the update data subset specifies a set of data fields of the data object that are less than a number of data fields comprising the update data determined by the owning user and sending, by the updating user, the update date message requesting the update data subset to the owning user.

Other features and advantages of the present invention should be apparent from the following description of the preferred embodiment, which illustrates, by way of example, the principles of the invention.

DETAILED DESCRIPTION

Figure 1:
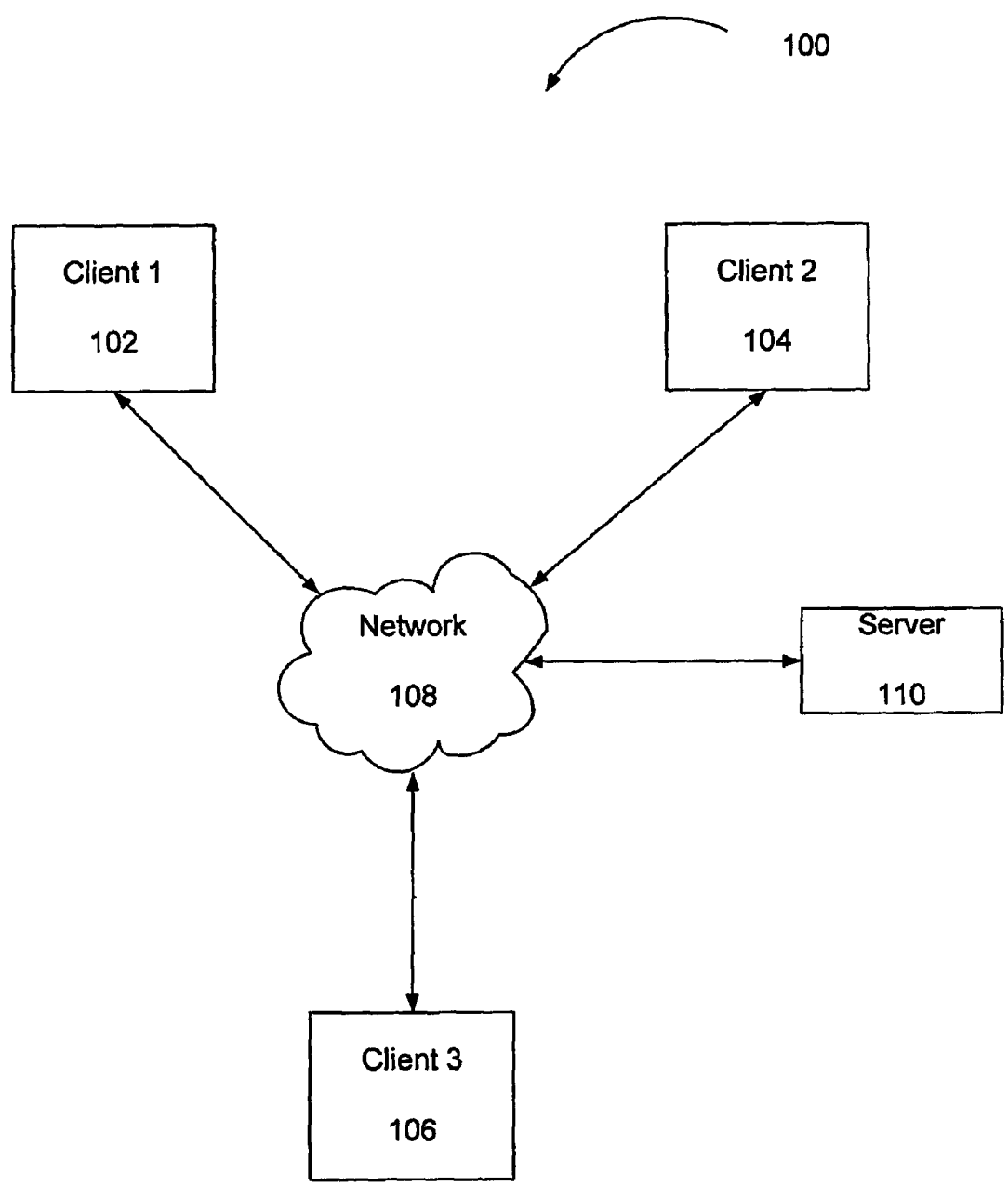
FIG. 1 is an illustration of a computer network constructed in accordance with the present invention.

FIG. 1 is an illustration of a computer network 100 constructed in accordance with the present invention. Multiple client computers 102, 104, 106 communicate with each other over a network 108. One or more server computers 110 also can communicate with the clients over the network. The computers communicate with each other over the network and cooperate in the processing of a multiple user application environment. The computers 102, 104, 106 can comprise, for example: computers such as conventional desktop personal computers; entertainment console devices such as the "Playstation 2" game console system available from Sony Computer Corporation of Tokyo, Japan; or other computing platforms that can provide or participate in a multiple user application programming environment. Three clients are shown in FIG. 1 for illustrative purposes only, but the system 100 can include a greater or lesser number of clients. It should be understood that the network 108 over which the computers communicate can comprise a variety of network configurations that facilitate data communications between the computers 102, 104, 106. The suitable networks include, for example, client-server and peer-to-peer computer network configurations.

The application programming environment in which the network clients 102, 104, 106 participate is one in which each client is responsible for at least one application data object. In the context of an on-line gaming application, for example, each client can correspond to a game contestant or entry of the user at the client machine. Therefore, each client will maintain a data object that defines a contestant. That is, each data object is defined by a set of data fields, as will be understood by those skilled in the art, who will be familiar with such object oriented programming concepts. The client is said to have ownership of the data object. In a business application, for example, each data object might correspond to a transaction or business account of a user or customer.

The data maintained by a user 102, 104, 106 for a corresponding data object will specify all parameters necessary to permit that data object to fully operate within the multiple user application environment. For example, in a multiple player aircraft simulation application, each user maintains (is said to "own") a data object corresponding to a virtual aircraft piloted by the user at each respective client. The data fields that fully define a data object corresponding to each user's aircraft would include data fields such as aircraft size, speed, altitude in three-dimensional space, appearance details (such as external damage or control surface position), virtual environment details (such as buildings, weather, and terrain), and the like. An example of the data fields that might be used to define an aircraft in a flight simulation network application is provided below in Table 1:

TABLE 1

| Data fields for aircraft data object | |
|---|---|
| Data field | Value (units) |
| PositionX | 3-dimensional space |
| PositionY | 3-dimensional space |
| PositionZ | 3-dimensional space |
| VelocityX | Km/hour & direction (heading) in space |

TABLE 1-continued

Data fields for aircraft data object

| Data field | Value (units) |
| --- | --- |
| VelocityY | Km/hour & direction (heading) in space |
| VelocityZ | Km/hour & direction (heading) in space |
| Posture | Friend/foe |
| Flap position | Angle of deflection |
| Damage value | 0-10 rating of damage |
| Aileron position | Angle of deflection |
| Landing gear position | Up/down |
| Aircraft serial no. | Alphanumeric data |

Other data fields in addition to those listed in Table 1 might also be used for completely defining an aircraft for the purpose of rendering an appropriate video image of the network application, such as lights on or off, afterburner on/off, identity of pilot, and the like.

Each owning user periodically updates the data fields that define its respective application object, and each owning user has the capability of sending an update message to all the other network users who are executing the network application, such that the update message contains the data maintained by the owning user. As described further below, the processing of the system 100 is such that each updating network user (that is, a user who is remote to an owning user) can request a reduced number of data fields for an object update from the respective owning users, thereby reducing the bandwidth requirements for maintaining the local data concerning the application object and reducing network traffic for the transfer of update data.

Figure 2:
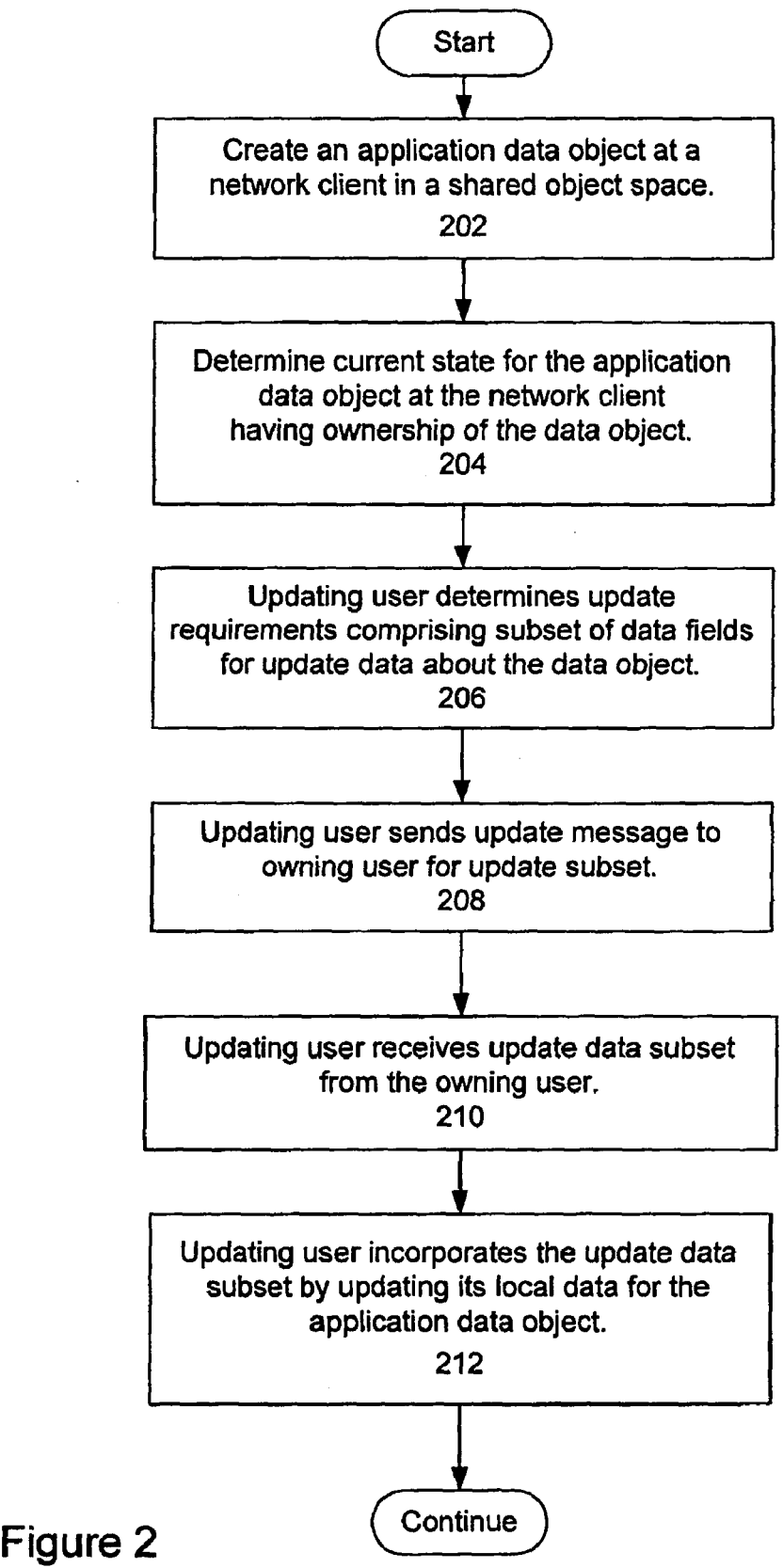
FIG. 2 is a flow diagram that illustrates processing at an updating user in the FIG. 1 system to provide selective application object update operations.

FIG. 2 is a flow diagram that illustrates processing in the FIG. 1 system to provide selective application object update operations wherein an updating user can request an update subset of the data fields for an application object that is owned by another user. The operations indicated in FIG. 2 are described from the perspective of a network user that is requesting an update from a remote network user with respect to an application object that is owned by that remote user. It should be understood, however, that each updating user in the system is performing similar operations, and that for any particular updating network user in the system, all the other users are remote clients to the updating network user, and the particular updating network user is regarded as the local network client.

In the first operation of FIG. 2, indicated by the flow diagram box numbered 202, a multiple user network application is launched at a network user and one or more application objects are detected by the user. The detected data objects are owned by other users of the network application. In an exemplary embodiment of the computer processing system, an application object is a data object that is maintained in a shared object space in accordance with the network application such that each network user who is running the application will be informed of the object's presence in the shared object space. That is, application data objects will exist in a shared data space such that all application users will be informed of the data objects and such that the data objects can interact with each other through data update messages and local processing at each user. Each data object is defined by a set of data fields that can include parameters and object methods, as will be understood by those skilled in the art. An example of the data fields that define an aircraft object is provided above in Table 1.

In a multiple player gaming application, for example, a server such as illustrated in FIG. 1 can maintain a collection of all application data objects for the shared data space, corresponding to one object for each user-contestant, along with data objects for associated items in the virtual game world, wherein each user at a network client has responsibility (ownership) of a data object corresponding to the user. Application users can obtain object updates from either the network server, which receives updates from each owning user (network client). In another embodiment, each of the network clients will maintain respective data objects for their corresponding user, and the network clients will exchange data relating to their respective application objects directly from each owning user, to maintain data copies in their respective user machines.

Next, at the flow diagram box numbered 204, the updating user performs operations to update the current state of the application object corresponding to the updating user. A similar update operation occurs locally at each network client of the system. Thus, the current state of each respective application data object is periodically updated by the network client who owns the data object. At box 206, the updating client determines the update requirements for the local information about the application data objects other than the object owned by the updating user (that is, the data objects of remote owning users). In accordance with the present invention, an updating user does not need to request an update comprising data for all of the data fields that define the remote data object.

In a conventional network application system, an update message typically includes data for all the data fields that define a data object. In the system illustrated in FIG. 1, the updating user can determine a subset of the data fields that define a network application data object, such that the specified update data subset received from a remote owning user is less than or equal to the number of data fields that would comprise a full update data message for the application object. In this way, an updating user has control over the update data that will be sent from a remote owning user, and therefore an updating user has control over the bandwidth necessary for efficiently receiving an update data transfer from an owning user.

The determination of the update data subset to be requested can be a function of a manual user selection, or the determination can be an automatic processing feature of the network application. For example, the network application can provide an updating user with a selectable menu that asks the user to manually specify the extent of update information to be requested, such as selecting between a full update and an abbreviated update subset. The user selection for the update data subset can be presented in terms of the user's network connection bandwidth.

The selection of the update data subset from among the available sets of data fields can be manually selectable or can be automatically determined and selected by the user computer, and additionally can be set once and maintained thereafter for the execution of the network application, or can be initially set when the application is first launched and then adjusted periodically thereafter during operation of the network operation. For example, the network application can obtain the bandwidth speed of the user's network connection from the user's operating system and can automatically determine the appropriate data subset selection when the application is launched. Thereafter, the network application can dynamically determine the update data subset according to the need or interest level of the local (updating user) application for the data object being updated, at each time of requesting an update or according to a different application update schedule. The level of interest can be a function of the updating user's interaction with the data object.

The dynamic determination is especially useful in a situation, for example, where the updating user's interaction is great, such as when aircraft are in a zone of increased interest (close formation) that requires a more complete set of data fields, or that are in a zone of decreased interest (flying in a distant airspace) for which a more limited data subset is sufficient for the network application. In these two exemplary aircraft simulation scenarios, the level of interest by the updating user is dependent on the proximity of the data object to the updating user in the virtual application space. User interest level in the data object can be indicated, for example, by the updating user's position in the application space relative to the data object (such as visually distinct or obscured), grouping or association in the application (such as ally or enemy), or purpose or goal of the network application (thereby determining level of interest based on application goal relative to the owning user). Other criteria can be used to determine the updating user's level of interest, in accordance with the network application being executed.

Figure 3:
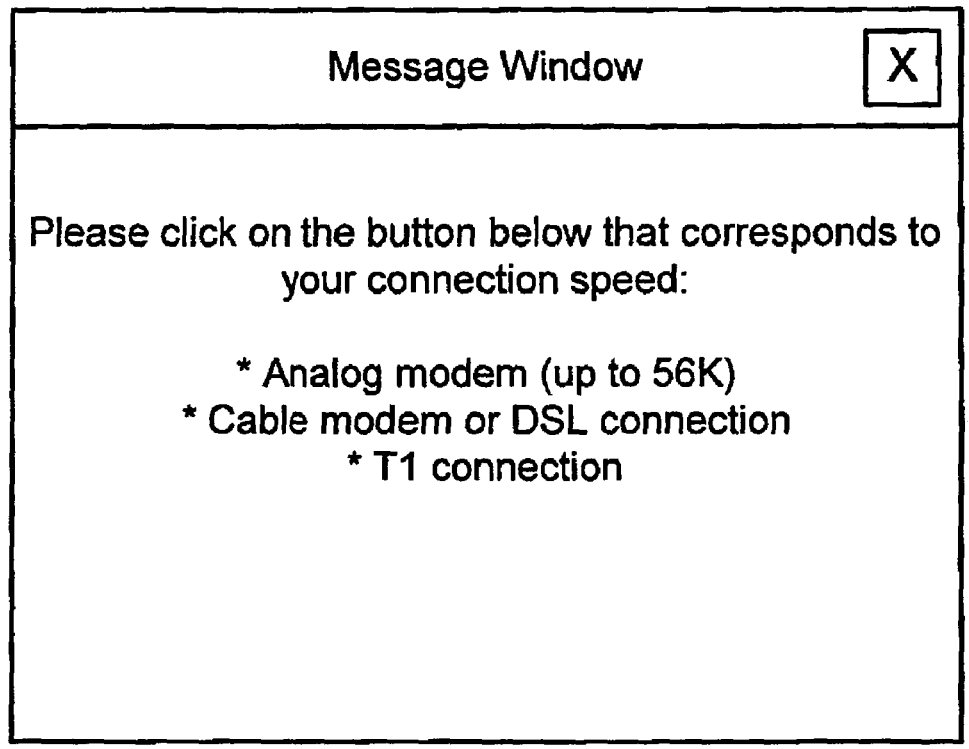
FIG. 3 shows a display screen selection menu that asks an application user to specify a connection speed and thereby indicate a data update subset.
Figure 3:
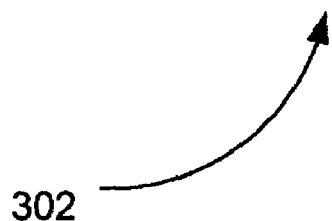

An example of selecting the number of data fields in an update subset, in terms of connection bandwidth, is depicted in FIG. 3, which shows a display screen selection menu 302 of the network application that asks the user to specify a connection speed, either an analog modem connection speed, or one of several broadband connection speeds. When the user selects one of the connection speeds, the network application at the local client will generate update request messages with a corresponding update data subset. For example, for a T1 connection, the application will automatically select the full update data message from the owning users, but for an analog modem connection, the application will automatically select a reduced amount of data from the owning user. As an example, the automatic determination can be performed in accordance with system information learned through the client operating system. Other schemes to select the extent of information to be requested will occur to those skilled in the art. Regardless of the determination technique employed, the processing in accordance with the invention provides a local client with the ability to specify the number of data fields it will request from a remote client for a data update relating to an application data object. In this way, the local client is not required to request and accept update data for all the defining data fields that would otherwise be provided in an update data message for an application data object.

The granularity of the data subset selection can comprise a data field-by-data field selection to comprise the update data subset, or can be from among a set of predetermined data field subset collections. For example, the user menu of FIG. 3 can provide a menu of data field subsets. In the situation where the selection of the data field subset is automatically determined by the network application, the subset can comprise one of several data field subsets. For example, in a network application that is an aircraft flight simulation, the data fields that completely define an aircraft object might correspond to the fields listed in Table 1, above. For a user with an analog modem connection of 56K (the first button in the window display of FIG. 3), the network application can automatically select an abbreviated, data field subset of parameters as listed in Table 2 below (referred to as Subset 1):

TABLE 2

Subset 1 of data fields for aircraft data object

| Data field | Value (units) |
| --- | --- |
| PositionX | 3-dimensional space |
| PositionY | 3-dimensional space |
| PositionZ | 3-dimensional space |
| VelocityX | Km/hour & direction (heading) in space |
| VelocityY | Km/hour & direction (heading) in space |

TABLE 2-continued

Subset 1 of data fields for aircraft data object

| Data field | Value (units) |
| --- | --- |
| VelocityZ | Km/hour & direction (heading) in space |

For a user with a cable modem or DSL connection (the second button in the window display of FIG. 3), the network application can automatically select an abbreviated data field subset of parameters as listed in Table 3 below (referred to as Subset 2):

TABLE 3

Subset 2 of data fields for aircraft data object

| Data field | Value (units) |
| --- | --- |
| PositionX | 3-dimensional space |
| PositionY | 3-dimensional space |
| PositionZ | 3-dimensional space |
| VelocityX | Km/hour & direction (heading) in space |
| VelocityY | Km/hour & direction (heading) in space |
| VelocityZ | Km/hour & direction (heading) in space |
| Posture | Friend/foe |
| Damage value | 0-10 rating of damage |
| Landing gear position | Up/down |

Thus, Subset 2 of the available update data subset includes more data fields than Subset 1, but not as many data fields as a full update message, which would include current data field values for all the object-defining data fields listed in Table 1. Other buttons and data subsets could be included for other connection bandwidths, such as wireless LAN connections, wireless Internet cellular connections, and the like. In a similar manner, other data field update subsets can be provided, to provide a different granularity for selecting update subsets in accordance with the available user bandwidth. The granularity to be provided can be determined by those skilled in the art, in connection with providing the network application.

Returning to FIG. 2, in the next operation, specified by the box numbered 208, the local client sends the update request message to the remote client. The format of the update request message will depend on the network application that is being operated by all of the clients 102, 104, 106 (FIG. 1). It is conventional for an owning user to update its data object using an update broadcast schedule (a local update). In the illustrated system, each updating user (remote to the owning user) can produce a remote object broadcast schedule that specifies an update subset of application object data fields. In this way, the owning user (the local client) knows what information is being requested by the updating client, as well as other details of the update message (such as frequency of update, bandwidth settings, and the like).

In accordance with the invention, the update request message will contain a field or parameter that will be recognized by the remote updating clients as specifying a subset of update data, as compared with a full or complete data update message. As noted above, the update data set can be either the full update set (that is, an update message with values for all the defining fields of a data object), or the update data set can be a reduced number of data fields that is a subset of the data fields comprising the full data update message. In either case, the remote client (the data object-owning client) that receives the update data request message from the updating client will respond by providing the requested amount of data. The updating user will then receive the update data subset message from the owning user, as indicated by the flow diagram box numbered 210.

In the last update processing operation, indicated by box 212, the update requesting user incorporates the updated data into the local object data space for the corresponding application object. This operation can comprise, for example, updating the local client's data relating to the owning client's data object, and can include updating a visual display representation showing the owning client's application object. Other processing of the network application can then continue.

Figure 4:
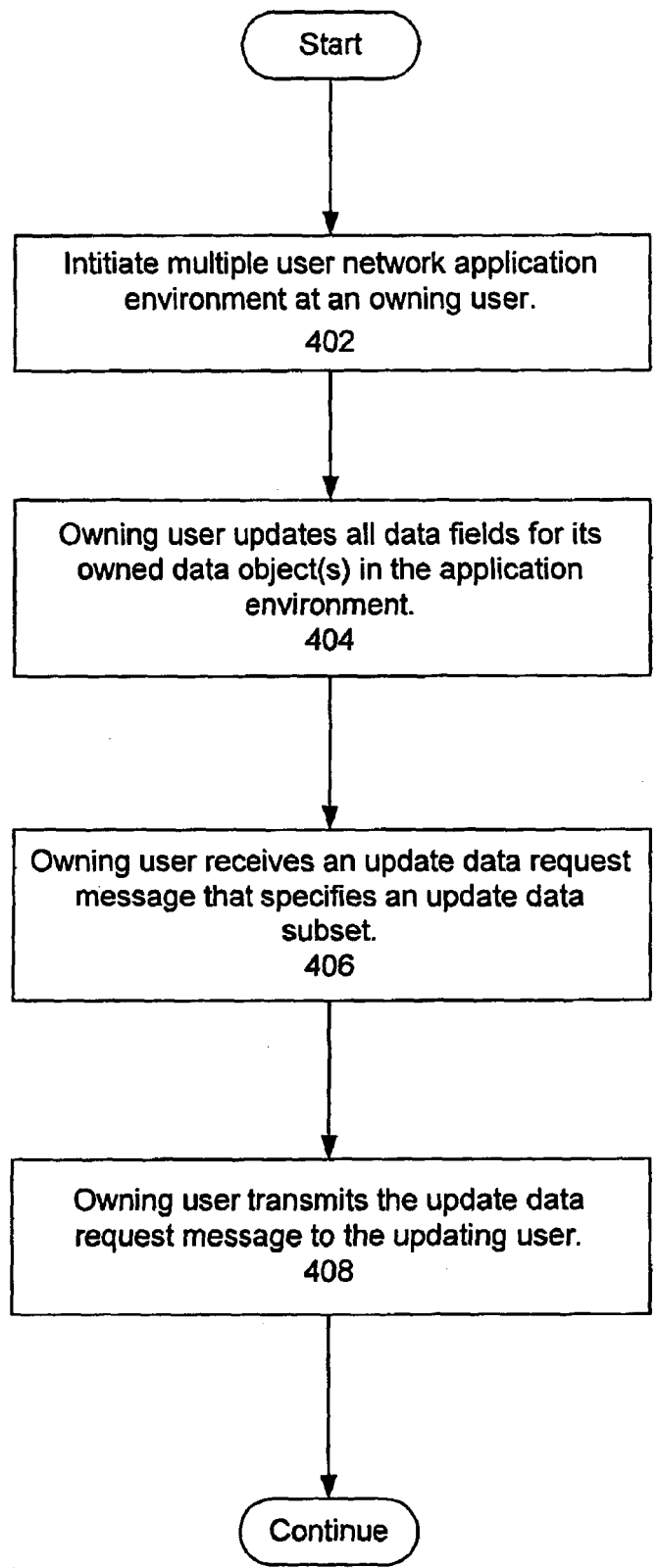
FIG. 4 is a flow diagram that illustrates processing at an object-owning user in the system of FIG. 1.

FIG. 4 is a flow diagram that illustrates processing at a data object-owning client of the system of FIG. 1 with respect to updating users at other (remote) network clients running the network application. The owning user will update the data fields of the data object owned by the owning user and will receive update request messages from other users of the network application. The first operation, represented by the flow diagram box numbered 402, comprises initiating the multiple user network application environment at an owning user. As noted above, the network application can involve an on-line gaming scenario, a transaction oriented scenario, or any other application that supports a multiple-user, shared object data space.

In the shared object data space, each participating user has ownership of one or more application objects. For example, in the context of an on-line gaming scenario, each object-owning user has ownership of an application object that represents the owning user contestant in the application environment. Each owning user must periodically perform an update operation for the owned application object, in which the state of the application object is updated according to the data fields that define the data object. This update operation is represented by the FIG. 4 flow diagram box numbered 404.

Because each owning user operates in the shared object data space of the network application, each owning user is aware of the other users (who are network nodes, or clients) that are also operating in the shared object data space. In accordance with the network application, each participating user will periodically generate an update data request message. The update data request message is sent to each remote owning user. As noted above, depending on the configuration of the network application, the update data request messages can be sent to a central application server, who responds to each update message in accordance with the data subset specified in the message. In either situation, at box 406, the update data request message is received at a network client storing data corresponding to all the defining data fields of a data object such that the update data request message requests an update data subset. At box 408, the update data subset is transmitted to the updating user identified in the update data request message.

The operations above were described in the context of an exemplary online gaming application, such as an aircraft flight simulation. Such an application can include, for example, a shared object space that includes three users who cooperate in the network gaming application to operate three corresponding allied aircraft, while three other users cooperate among themselves to operate three corresponding enemy aircraft. Each of the users will individually update all the data fields that define their respective aircraft, such as the data fields listed above in Table 1. In the case of the three ally aircraft, if the three are operating in close formation (in terms of three-dimensional virtual space), then it will be important for each of the three ally aircraft users to receive full data updates. For example, one of the three close formation ally aircraft decides to land on the ground, then it would be important to know the state of the landing aircraft's Table 1 data fields for Flap position, Aileron position, and Landing gear position, for a proper visual rendering at the computer of each ally aircraft user. In the case of the three enemy aircraft, who are located at a more distant position in the application virtual space, the only data fields of interest would likely be the range data in terms of PositionX, PositionY, and PositionZ, as well as corresponding velocity information. It should be apparent that this reduced set of object data fields can be provided by the Subset 1 grouping of Table 2. It should be apparent that Table 2 has less bandwidth required than the full data update fields (Table 1) for transmission.

Those skilled in the art will appreciate that other network applications also can be provided with the data update subset feature described above. For example, streaming data applications with relatively large bandwidth requirements can utilize the data update subset feature, including applications that transmit streaming data comprising video, voice, and audio data, that can be requested dynamically by network users. Thus, network application users, streaming data, and polygonal (shape) data can populate a virtual world. Each application user can have network control of predefined data objects (that is, data objects that are defined by a predetermined set of data fields). Each network application user will therefore update the objects for which the user has ownership. In the case of a user who is updating a streaming object, such as a video streaming object, the video stream will be visible to some application users as a face with accompanying voices or sounds, while to other application users the video stream will be visible only as noise on a screen. That is, some updating users can specify only data fields comprising audio data, while other updating users can specify data fields comprising video data but not audio data, or other combinations of the data fields that define the streaming object, in accordance with available bandwidth, or local user interest, or other parameters. Thus, in accordance with the invention, each application user will specify the resolution desired from each video stream (and other data) being received and will have control of the remote update messages it receives. The network user (client or server) in control of the video stream sends only the appropriate update data subset requested by each updating user. As noted above, each updating user can determine the update data subset desired according to its operating situation.

It should be understood that the "owning user" as described above can comprise any network user (node) that is responsible for one or more objects in the network shared object space. That is, the network application can be configured such that a single user owns all the objects of the application. This can be the situation, for example, when a server owns all the objects in the application space and communicates with client machines who request data updates. In that situation, all of the network application clients then become updating users, who request object updates from the owning user (the server) of the network application. Thus, the network application can be configured such that an owning user comprises a client machine at a network node, and each client owns one or more corresponding objects in the shared object space of the application, or the network application can be configured such that there is one owning user for the application, such as an application server, who provides object updates for all the other users of the network application.

Those skilled in the art will understand how to implement the dynamic bandwidth control described above in the situation where there is one owning user for the network application, such as an application server. As noted above, an owning user for a network application is a user who is responsible for maintaining state data about a user's interaction with the network application. Thus, if there is only one owning user for the application, then that user (server) will be responsible for maintaining state information about the objects corresponding to each of the application users. For example, in a network gaming scenario, a client user can have control of that user's movement in a shared object space, but the server would own the objects and therefore would maintain the state data relating to that client user's corresponding object in the shared space. Thus, each of the client users will request updates from the owning user (server).

Thus, each user of the network application can have ownership of a corresponding data object of the network application shared data space, or a single network node of the network application can have ownership of all data objects of the network application shared data space that correspond to users. In the case of the single object-owning node, that node is typically referred to as an application server. With respect to FIG. 1, in the first scenario of this paragraph, the client nodes 102, 104, 106 each own their respective data objects. In the second scenario of this paragraph, the single user (server) 110 has ownership of data objects that represent each of the clients 102, 104, 106.

Figure 5:
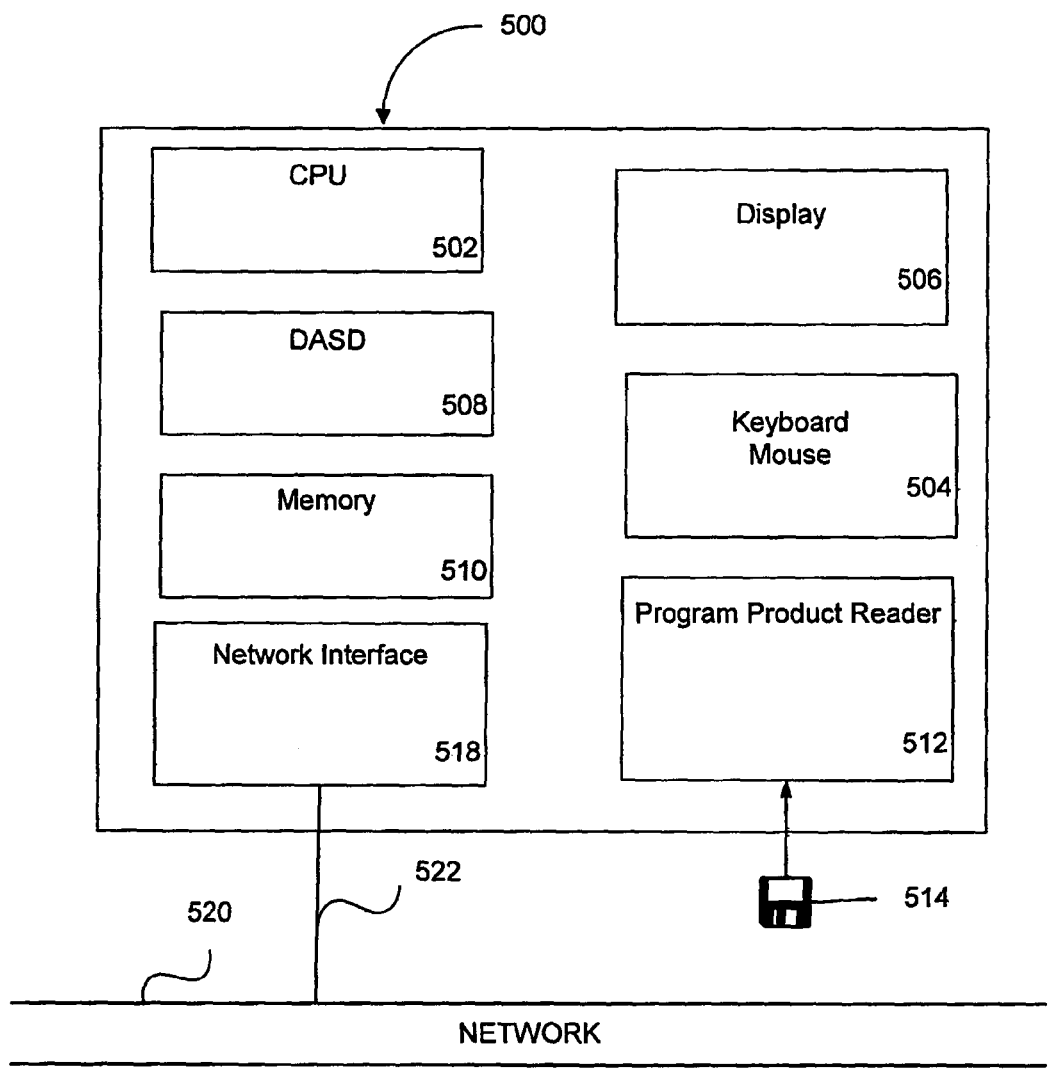
FIG. 5 is a block diagram of a computer in the network illustrated in FIG. 1, illustrating the hardware components.
Figure 6:
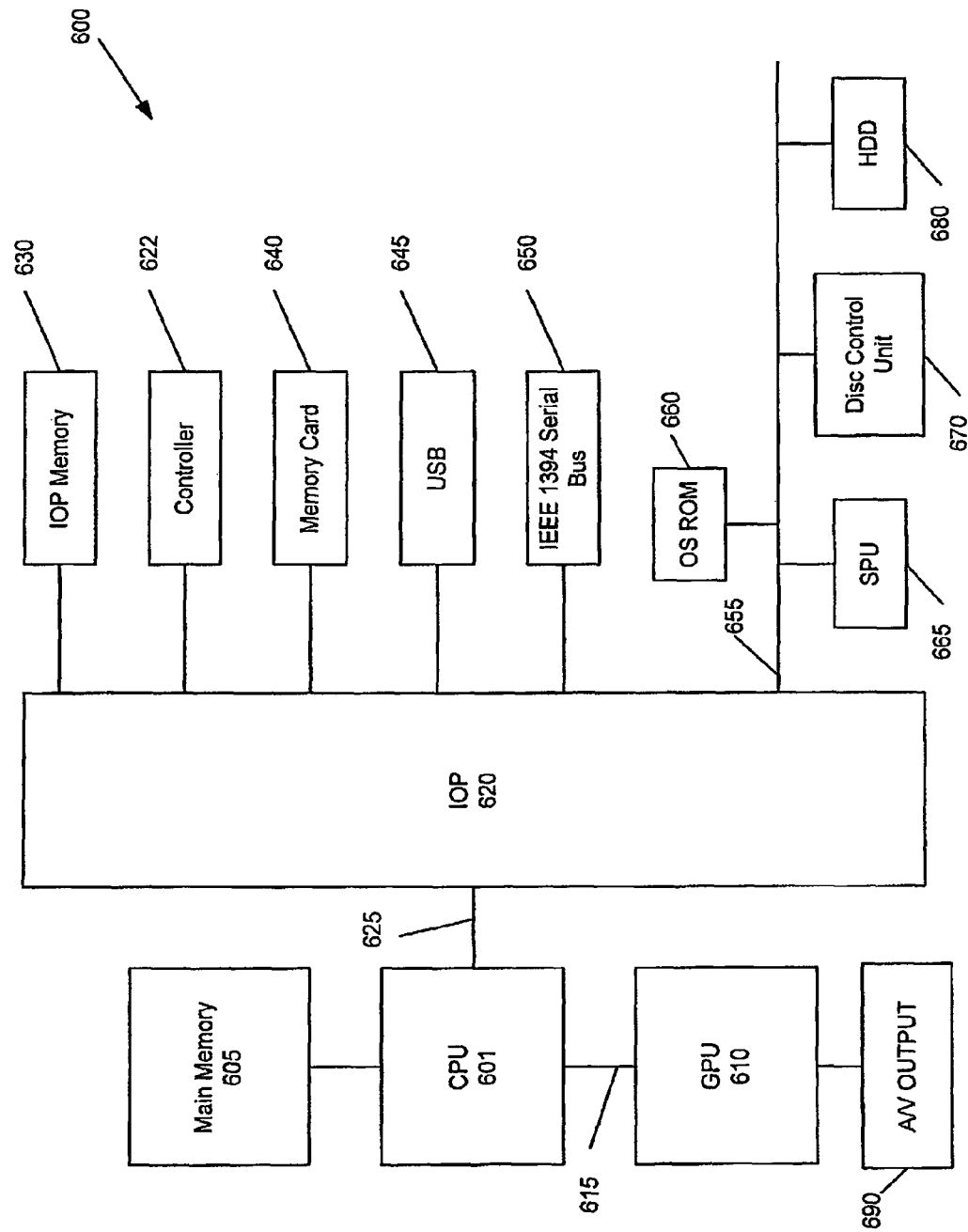
FIG. 6 is a block diagram of a computer entertainment system at a network node of the network illustrated in FIG. 1, showing the hardware components.

The aforementioned operations can be executed in accordance with the network application, as installed on suitable network computing devices. FIG. 5 and FIG. 6 are block diagrams of network computing devices that can be adapted to operate in accordance with the invention, as described above.

The network computer devices (clients and servers) shown in the block diagram of FIG. 1 comprise nodes of a computer network system 100. FIG. 5 is a block diagram of a computer in the system 100 of FIG. 1, illustrating the hardware components included in one of the computers that provide the functionality of the servers and clients. Those skilled in the art will appreciate that the servers and clients illustrated in FIG. 1 can all have a similar computer construction, or can have alternative constructions consistent with the capabilities and respective functions described herein. The FIG. 5 construction is especially suited for the server computer 110 illustrated in FIG. 1.

FIG. 5 shows an exemplary computer 500 such as might comprise any of the network computers 102, 104, 106, 110. Each computer 500 operates under control of a central processor unit (CPU) 502, such as a "Pentium" microprocessor and associated integrated circuit chips, available from Intel Corporation of Santa Clara, Calif., USA. A computer user can input commands and data from a keyboard and computer mouse 504, and can view inputs and computer output at a display 506. The display is typically a video monitor or flat panel display. The computer 500 also includes a direct access storage device (DASD) 508, such as a hard disk drive. The memory 510 typically comprises volatile semiconductor random access memory (RAM). Each computer preferably includes a program product reader 512 that accepts a program product storage device 514, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 500 can communicate with the others over a computer network 520 (such as the Internet or an intranet) through a network interface 518 that enables communication over a connection 522 between the network 520 and the computer. The network interface 518 typically comprises, for example, a Network Interface Card (NIC) and a modem that permits communications over a variety of networks.

The CPU 502 operates under control of programming steps that are temporarily stored in the memory 510 of the computer 500. When the programming steps are executed, the computer performs its functions. Thus, the programming steps implement the functionality of the respective client or server. The programming steps can be received from the DASD 508, through the program product storage device 514, or through the network connection 522. The program product storage drive 512 can receive a program product 514, read programming steps recorded thereon, and transfer the programming steps into the memory 510 for execution by the CPU 502. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 510 over the network 520. In the network method, the computer receives data including program steps into the memory 510 through the network interface 518 after network communication has been established over the network connection 522 by well-known methods that will be understood by those skilled in the art without further explanation. The program steps are then executed by the CPU 502 thereby comprising a computer process.

It should be understood that all of the network computers of the network system 100 illustrated in FIG. 1 can have a construction similar to that shown in FIG. 5, so that details described with respect to the FIG. 5 computer 500 will be understood to apply to all computers of the system 100. It should be appreciated that any of the network computers can have an alternative construction, so long as the computer can communicate with the other computers illustrated in FIG. 1 and can support the functionality described herein.

For example, any of the FIG. 1 client computers 102, 104, 106 can comprise a computer entertainment system, such as a video game console system 600 shown in FIG. 6. FIG. 6 is a block diagram of an exemplary hardware configuration of the video game console system 600.

The video game console system 600 includes a central processing unit (CPU) 601 that is associated with a main memory 605. The CPU 601 operates under control of programming steps that are stored in the OS-ROM 660 or transferred from a game program storage medium to the main memory 605. The CPU 601 is configured to process information and execute instructions in accordance with the programming steps.

The CPU 601 is communicatively coupled to an input/output processor (IOP) 620 via a dedicated bus 625. The IOP 620 couples the CPU 601 to the OS ROM 660, which is comprised of a non-volatile memory that stores program instructions, such as an operating system. The instructions are preferably transferred to the CPU via the IOP 620 at start-up of the main unit 600.

The CPU 601 is communicatively coupled to a graphics processing unit (GPU) 610 via a dedicated bus 615. The GPU 610 is a drawing processor that is configured to perform drawing processes and formulate images in accordance with instructions received from the CPU 601. For example, the GPU 610 can render a graphics image based on display lists that are generated by and received from the CPU 601. The GPU can include a buffer for storing graphics data. The GPU 610 outputs images to an AV output device 690 that is connected to the console system 600.

The IOP 620 controls the exchange of data among the CPU 600 and a plurality of peripheral components in accordance with instructions that are stored in an IOP memory 630. The peripheral components can include one or more input controllers 622, a memory card 640, a USB 645, and an IEEE 1394 serial bus 650. Additionally, a bus 655 is communicatively coupled to the IOP 620. The bus 655 is linked to several additional components, including the OS ROM 660, a sound processor unit (SPU) 665, an optical disc control unit 670, and a hard disk drive (HDD) 680.

The SPU 665 is configured to generate sounds, such as music, sound effects, and voices, in accordance with commands received from the CPU 601 and the IOP 620. The SPU 665 can include a sound buffer in which waveform data is stored. The SPU 665 generates sound signals and transmits the signals to speakers.

The disc control unit 670 is configured to control a program reader, which can comprise, for example, an optical disk drive that accepts removable storage media such as a magnetic floppy disk, an optical CD-ROM disc, a CD-R disc, a CD-RW disc, a DVD disk, or the like.

The memory card 640 can comprise a storage medium to which the CPU 601 can write and store data. Preferably, the memory card 640 can be inserted and removed from the IOP 620. A user can store or save data using the memory card 640. In addition, the video game system 600 is preferably provided with at least one hard disk drive (HDD) 680 to which data can be written and stored.

A data I/O interface, such as an IEEE 1394 serial bus 650 or a universal serial bus (USB) 645 interface, is preferably communicatively coupled to the IOP 620 in order to allow data to be transferred into and out of the video game system 600, such as to the network illustrated in FIG. 1.

Thus, the embodiment described above provides improved data transfer over a computer network from a remote client to a local client for a multiple user network application. The improved data transfer is managed by determining a specified amount of update data for a network application object of the remote client, such that the specified amount is less than or equal to a full update data message for the application object. A request message is sent from the local client to the remote client that requests the specified amount of update data from the remote client. When the specified amount of update data is received at the local client, the local client data state for the application object is updated with the received update data. With this operation, it is not necessary for the local client to always request the full update data message on all application objects from the remote client, but instead the local client can request a reduced amount of update data for the state of an application object. This can reduce the bandwidth required by the local client to execute the multiple user network application and update the data state of application objects.

The present invention has been described above in terms of a presently preferred embodiment so that an understanding of the present invention can be conveyed. There are, however, many configurations for the system and application not specifically described herein but with which the present invention is applicable. The present invention should therefore not be seen as limited to the particular embodiment described herein, but rather, it should be understood that the present invention has wide applicability with respect to multi-user applications generally. All modifications, variations, or equivalent arrangements and implementations that are within the scope of the attached claims should therefore be considered within the scope of the invention.

What is claimed is:

1. A method of computer network data transfer, the method comprising:
    updating, by an owning user, a set of data fields that define a data object in a multiple user network application shared data space;
    receiving, by the owning user from an updating user, a network data update request message requesting an update data subset from the owning user, the update data subset being determined by the updating user and relating to the data object maintained by the owning user, wherein the updating user maintains a local copy corresponding to the data object and the update data subset specifies a set of data fields that is less than a full data update for the data object; and
    transmitting, by the owning user to the updating user, update data for the data object comprising the set of data fields as determined by the updating user.

2. The method as defined in claim 1, wherein the owning user has ownership of more than one data object of the multiple user network application shared data space.

3. The method as defined in claim 1, wherein the owning user has ownership of all data objects of the multiple user network application shared data space.

4. The method as defined in claim 3, wherein the owning user comprises a server and all other clients in the multiple user network application comprise updating users who request object updates from the server.

5. The method as defined in claim 1, wherein the network application includes the transfer of streaming data over the network.

6. The method as defined in claim 5, wherein the owning user sends streaming data and the network data update request message specifies a resolution desired for the streaming data.

7. The method as defined in claim 1, wherein the updating is performed periodically.

8. The method as defined in claim 1, wherein the update data subset is determined by steps comprising determining an available network bandwidth and determining the update data subset in accordance with the available bandwidth.

9. A program product for use in a computer device that executes program instructions recorded in a computer-readable storage media to perform a method for data transfer over a computer network, the program product comprising:
    a recordable device; and
    a plurality of computer readable instructions executable by the computer device to perform a method comprising:
        updating, by an owning user, a set of data fields that define a data object in a multiple user network application shared data space;
        receiving, by the owning user from an updating user, a network data update request message requesting an update data subset from the owning user, the update data subset being determined by the updating user and relating to the data object maintained by the owning user, wherein the updating user maintains a local copy corresponding to the data object and the update data subset specifies a set of data fields that is less than a full data update for the data object; and
        transmitting, by the owning user to the updating user, update data for the data object comprising the set of data fields as determined by the updating user.

10. An owning user device comprising:
    a network communication interface that supports data transfer between the owning device and a network; and a central processing unit that executes program instructions to provide a multiple user network application in which, the owning user device updates a set of data fields that define a data object in a multiple user network application shared data space;

the owning user device receives, from an updating user device, a network data update request message requesting an update data subset from the owning user device, the update data subset being determined by the updating user device and relating to the data object maintained by the owning user device, wherein the updating user device maintains a local copy corresponding to the data object and the update data subset specifies a set of data fields that is less than a full data update for the data object; and the owning user device transmits, to the updating user device, update data for the data object comprising the set of data fields as determined by the updating user device.

* * * * *